United States Patent Office 3,366,538
Patented Jan. 30, 1968

3,366,538
METHOD OF DISINFECTING SEEDS
Horst Werres, Berlin, Dietrich Baumert, Kirchheim, and Reinhart Rusch, Berlin, Germany, assignors to Schering A.G., Berlin, Germany
No Drawing. Filed July 16, 1965, Ser. No. 472,687
1 Claim. (Cl. 167—38)

This invention relates to biocidal compositions having fungicidal, nematocidal, and herbicidal effects. More particularly, it relates to biocidal compositions containing beta-chloroethyl isothiocyanate or p-chlorobenzyl isothiocyanate as active agents.

Various isothiocyanates are known in the art to have biocidal effects.

Smedly (J. Helminthol., 17, 31–8, 1939) has described the nematocidal effects of ethyl, n-butyl, phenyl, o-tolyl, p-tolyl, and p-hydroxyphenyl isothiocyanate. Methyl isothiocyanate is also suitable for combating nematodes according to the published German application No. 1,032,968 and United States No. 3,113,908. The fungicidal and herbicidal effects of the last-mentioned compounds have also been described in Plant Disease Reptr., 45, 54–7, 1961.

Contrary to the active agents of the instant invention, the known compounds have broad-spectrum effects against soil dwelling fungi and broad herbicidal effects. The bacteriostatic effects of p-chlorobenzyl isothiocyanate are known from the Canadian Patent No. 579,233. The use of p-chlorobenzyl isothiocyanate as a "nematocide for eggs of ascaris" has been disclosed in the published Japanese application No. 200 of 1960. The known nematocidal effects against roundworms (ascaris) and the equally known bacteriostatic effect of p-chlorobenzyl isothiocyanate, however, did not permit the fungicidal and herbicidal effects of the compounds of the invention to be expected.

Although the biocidal effects of the isothiocyanates are good, they could not be employed heretofore as seed disinfectants or herbicides because of their excessively phytotoxicity and other deleterious physical properties.

It has now been found that isothiocyanates of the formula $$R-N=C=S$$

wherein R is β-chloroethyl or p-chlorobenzyl are excellently suited as seed disinfectants. They successfully replace the known mercury-containing disinfectant compositions, which are dangerous because of the toxicity of mercury.

The compounds of the invention also have superior effects against fungi in the soil since they have nematocidal, herbicidal effects; and p-chlorobenzyl isothiocyanate has even been found to have selective herbicidal effects. Because of their broad biocidal effects, the compositions of the invention herein are particularly suitable for prevention and control of plant diseases, and for the control of parasites and weeds. Their major importance, however, is due to their applicability as seed disinfectants. Furthermore, the superior biocidal effects of the compounds of the invention are evident from the following examples which are illustrative and not restrictive of the invention.

Example 1

This example illustrates the superior fungicidal effect of β-chloroethyl isothiocyanate against *Fusarium nivale*. Rye seed naturally infested with *Fusarium nivale* was divided into several batches which were left untreated, treated with the agent of the invention, and treated with a commercial universal mercurial disinfectant respectively, sown in clay pots containing soil that had not been sterilized, and cultivated in a refrigerated room at 7 to 12° C. in artificial light for two months. During the test, the infestation of the rye plants with the fungus was evaluated, and was calculated in percent of the attack on plants grown from untreated rye.

EFFECT AGAINST *FUSARIUM NIVALE* IN COLD ROOM CULTIVATION

| Disinfectant | Grams (ml.) disinfectant per 100 kg. seeds | Percent infection Untreated = 100% |
|---|---|---|
| β-Chlorcethyl isothiocyanate (20% solution in xylene with an emulsifier) | 100 ml.+1 liter water | 3 |
| Universal dry disinfectant containing 6% methoxyethyl-Hg-silicate | 100 g  200 g | 43 / 7 |
| Untreated control | 0 | 100 |

Example 2

This example shows the strong fungicidal potency of p-chlorobenzyl isothiocyanate as a seed disinfectant. Rye seed naturally infected with *Fusarium nivale* was treated with the agent of the invention or left untreated, and spread on oat, a flour-lactic acid-agar nutrient. The mycelium growth spreading from the grains was evaluated after four days' cultivation at 24° C. This growth is listed below in percent of the value for untreated controls.

EFFECT AGAINST *FUSARIUM NIVALE* IN LABORATORY TEST

| Disinfectant | Grams (ml.) disinfectant per 100 kg. seeds | Mycelium Growth, Percent |
|---|---|---|
| p-Chlorobenzyl isothiocyanate (20% in solution with emulsifier) | 100 ml.+1 liter water | 14 |
| Universal dry disinfectant with 6.9% methoxyethyl-Hg-silicate | 200 g | 36 |
| Control | 0 | 100 |

Example 3

The strong fungicidal effect of p-chlorobenzyl isothiocyanate as a seed disinfectant is also evident from the following example. Seed was infected artificially by shaking with 3 g. spores of *Tilletia tritici* per kilogram seed, and wheat grains, untreated and treated with the agent of the invention were pressed, beard first, into levigated loam, and stored in a refrigerator at 13° C. 50% of the grains was withdrawn after three days. After an additional period of four days, the average germination of the bunt spores remaining in the holes was evaluated.

EFFECT AGAINST *TILLETIA TRITICI* IN LABORATORY TEST

| Disinfectant | Grams (ml.) disinfectant per 100 kg. seeds | Germination of spores after 10 days |
|---|---|---|
| p-Chlorobenzyl isothiocyanate (20% solution in xylene with emulsifier) | 80 ml.+1 liter H₂O | less than 1. |
| Universal dry disinfectant containing 6.9% methoxyethyl-Hg-silicate | 80 g | 13. |
| Control | 0 | 100. |

Example 4

This example shows the strong disinfectant effect of β-chloroethyl isothiocyanate against fungus infection of cereal crops in the field.

TEST METHOD (a) Wheat seeds were artificially infected by shaking the seeds with 3 g. spores of *Tilletia tritici* per 1 kg. seed. Wheat which was untreated, treated with the agent of the invention, or treated with mercurial universal seed disinfectant was then sown in the field. The ears infected with the fungus were counted at harvest time.

(b) Rye seeds naturally infected with streak disease (*Helminthosporium gramineum*) were sown in a field in the untreated condition, disinfected with the agent of the invention, or with mercurial universal seed disinfectant. The stalks infected by streak disease were counted after sprouting.

| Disinfectant | Grams (ml.) disinfect. per 100 kg. seed | Tilletia tr., percent of ears | Helm. gram., percent of stalk |
|---|---|---|---|
| β-Chloroethyl isothiocyanate (20% solution in xylene with emulsifier). | 100 ml. +1 liter water. | 0.1 | |
| β-Chloroethyl isothiocyanate (15% dry composition). | 175 g | | 0.1 |
| Universal dry disinfectant containing 6% methoxy-ethyl-Hg-silicate. | 37.5 g | 0.1 | 0.1 |
| | 150 g | 0 | 0 |
| Control | 0 | 39.1 | 4.2 |

*Example 5*

This example shows the disinfectant effect of p-chlorobenzyl isothiocyanate against fungus infection of cereal crops in field tests. The field tests were performed as follows:

(a) Barley seeds naturally infected with streak disease (*Helminthosporium gramineum*) were sown in the field without prior treatment, treated with the agent of the invention, or treated with mercurial universal disinfectant. After sprouting, the stalks infected with the streak disease were counted.

(b) Oat seeds naturally infected with loose smut (*Ustilago avenae*) were additionally artificially infected according to the wet vacuum method (Purdy, Plant Dis. Reptr. 42 (1958), 233-7), and were sown in the field in the untreated condition, after treatment with the agent of the invention, and after treatment with mercurial universal disinfectant. The panicles infected with the loose smut were counted later.

DISINFECTANT EFFECT OF p-CHLOROBENZYL ISOTHIOCYANATE AGAINST FUNGUS INFECTION OF CEREAL CROPS IN FIELD TESTS

| Disinfectant | Gram (ml.) disinfectant per 100 kg. seed | Helm. gram. on winter barley, percent stalks | Ust. avenae on oats, percent of panicles |
|---|---|---|---|
| p-Chlorobenzyl isothiocyanate (20% in xylene with emulsifier). | 100 ml.+1 liter water. | 0 | |
| p-Chlorobenzyl isothiocyanate as 15% dry composition. | 300 g | | 3.6 |
| Universal dry disinfectant containing 6% methoxy-ethyl-Hg-silicate. | 300 g | | 4.5 |
| | 150 g | 0 | |
| | 75 g | 0.1 | |
| Control | 0 | 5.1 | 23.7 |

*Example 6*

This example shows the stronger fungicidal effect in the soil of β-chloroethyl isothiocyanate as compared with known compositions. The tests were performed in the laboratory according to the following method:

Sterilized mixtures of peat, and sand were placed in sterile glass cylinders. Mycelium disks of the fungus to be tested and having a diameter of 10 mm. were placed on the substrate in each cylinder, and covered with additional substrate.

Solutions of the compounds to be tested were added drop by drop into the cylinders, and after completion of the addition the cylinders were covered with larger inverted cylinders. The concentration of the active agent increased within individual cylinders of each series in an approximately geometrical progression (0–10–20–50–100), and three parallel tests were made with each amount of active agent. After cultivation at 20° C. for 24 hours, inocula were withdrawn under sterile conditions, laid upon agar free from toxicants, and cultivated again for 2–10 days. The amount of each agent which prevented further growth of the fungus was then determined (fungitoxic threshold concentration).

The data of the following table are in p.p.m. active substance (=mg./1000 cubic centimeters of substrate).

| Active agent | Pythium ultimum | Rhizoctonia solani | Fusarium solani |
|---|---|---|---|
| β-Chloroethyl isothiocyanate | ≦50 | ≦50 | ≦100 |
| Methyl isothiocyanate | | | 200 |
| N-(trichloromethylthio)-tetrahydrophthalimide | 50 | 100 | |
| Pentachloronitrobenzene | 125 | 125 | |

*Example 7*

This example shows the excellent fungicidal effect of β-chloroethyl isothiocyanate against soil dwelling and leaf dwelling fungi. The compound of the invention is more effective in this test than the known N-(trichloromethylthio)-tetrahydrophthalmide.

The test was performed as follows:

One part of the emulsion or suspension of the agent was mixed with nine parts of a nutrient substrate (1.5% agar, 2% of a commercial malt preparation "Biomalz") which had been sterilized and cooled to 45° C. The active agent content of the emulsion or suspension fas selected in such a manner that the desired concentration in the nutrient was reached. The warm mixture was poured into sterile Petri dishes. After cooling and gelation, the nutrient was inoculated with mycelium or spore suspension (about 100 spores per inoculum) of important types of harmful soil or leaf dwelling fungi (mycelium of *Rhizoctonia solani*, spores of *Fusarium solani*, *Stemphylium consortiale* and *Aspergillus niger*).

In accordance with the different growth rates, the diameters of the colonies of *Rhizoctonia solani* were measured after 4 days of cultivation at +20° C., and those of the other fungi after 5 days.

RELATIVE FUNGUS GROWTH

[Control=1]

| Active agent | Concentration of active agent, p.p.m. | Rhizoctonia solani | Fusarium solani | Stemphylium consortiale | Aspergillus niger |
|---|---|---|---|---|---|
| β-Chloroethyl isothiocyanate | 10 | 0 | 0 | 0 | 0 |
| N-(trichloromethylthio)-tetrahydrophthalimide | 10 | 30 | 53 | 80 | 75 |
| Control | 0 | 100 | 100 | 100 | 100 |

Example 8

The selective herbicidal effect of p-chlorobenzyl isothiocyanate is evident from this example.

A 20% spraying powder composition was sprayed at a rate of 3 kg. of active agent per hectare in 1000 liters of water on wheat having 1.5 to 2 leaves, peas having 3 leaves, Galinsoga parviflora and Urtica uris having three pairs of leaves, and goosefoot having 4 to 7 leaves. The damage caused was evaluated after two weeks.

GREENHOUSE TEST

| Compound | Percent Damage in— | | | | |
| --- | --- | --- | --- | --- | --- |
| | Crop plants | | Weeds | | |
| | Wheat | Peas | Galinsoga | Goosefoot | Urtica uris |
| β-Chlorobenzyl isothiocyanate (20% powder in suspension) | 2 | 0 | 100 | 100 | 100 |
| Untreated Controls | 0 | 0 | 0 | 0 | 0 |

Example 9

This example shows the herbicidal effect of β-chloroethyl isothiocyanate.

Dishes of weeds were sprayed in a hot house with an aqueous composition containing 1% of the active agent, when the weeds had reached the following stages of development:

| | Foliage leaves |
| --- | --- |
| Amaranthus retroflexus L. | 1 |
| Matricaria chamomilla L. | 4–6 |
| Matricaria maritima L. | 4–6 |
| Senecio vulgaris L. | 4–5 |

The following table indicates the degree of damage done after two weeks:

| | Amaranthus | Matricaria | Senecio |
| --- | --- | --- | --- |
| γ-Chloroethyl isothiocyanate | 10 | 7 | 8 |
| Untreated | 0 | 0 | 0 |

Evaluation scale:
0=undamaged.
10=all plants totally destroyed.

Example 10

This test shows the high nematocidal potency of the β-chloroethyl isothiocyanate. The test was carried out as follows: Soil uniformly and strongly infected with *Meloidogyne incognita* var. *acrita*, and having a moisture content of 24% was treated with the several agents tested. The substances, in the concentrations indicated, were (a) uniformly mixed with the soil, and
(b) injected into the centers of 1 liter jars containing a soil column 12 cm. high.

A waiting period of 8 days at a temperature of 14 to 20 degrees C followed. The test jars were left uncovered during this period. After the waiting period, the soil was transferred to clay dishes having a diameter of 12 cm., and 30 tomato seeds of the strain "Prof. Rudloff" were placed in each dish. The nematocidal effects were evaluated after a cultivation period of 30 days at 23–26° C. by counting the root galls in a water bath. The efficiency was calculated according to Abbott's formula.

| Agent | Mg. active agent per liter soil | Nematocidal effect, percent | |
| --- | --- | --- | --- |
| | | (a) Intermixed | (b) Injected |
| β-Chloroethyl isothiocyanate (20% in xylene with emulsifier) | 50 | 100 | 100 |
| Ethyl isothiocyanate (20% in xylene with emulsifier) | 50 | 0 | 50 |

The monochloro derivative is surprisingly superior to the ethyl isothiocyanate.

Example 11

The nematocidal effect of p-chlorobenzyl isothiocyanate is evident from this example.

The following types of nematodes were freshly isolated from plant parts or from the nutrient substrate, and were placed in 2 ml. batches of an emulsion of the active agent to be tested. The activity of the larvae was checked after 24 and 48 hours of contact. The number of nematodes killed is indicated hereinbelow in percent. The test was carried out at a temperature of 22 to 24° C.

(a) *Aphelenchoides ritzemabosi*
(b) *Ditylenchus dipsaci*
(c) *Meloidogyne incognita* var. *acrita*

| Concentration of active agent | Aphelenchoides | | Ditylenchus | | Meloidogyne | |
| --- | --- | --- | --- | --- | --- | --- |
| | 24 hrs. | 48 hrs. | 24 hrs. | 48 hrs. | 24 hrs. | 48 hrs. |
| 0.01% | 100 | 100 | 100 | 100 | 100 | 100 |
| 0.005% | 100 | 100 | 100 | 100 | 100 | 100 |
| 0.001% | 100 | 100 | 50 | 90 | 100 | 100 |
| 0.0005% | 100 | 100 | 30 | 80 | 100 | 100 |

The active agents of the invention may be prepared by methods which are well known in the art. β-chloroethyl isothiocyanate may be prepared by reacting the corresponding amine with thiophosgene, whereas p-chlorobenzyl isothiocyanate may be prepared by reacting the corresponding ammonium dithiocarbamate with chloroformic acid esters.

The active compounds may be employed in the form of compositions prepared in the manner commonly known for pesticides such as powders, dusting compositions, granulates, solutions or emulsions with addition of liquid or solid inert carriers, and with wetting and emulsifying agents.

Suitable liquid carriers include organic solvents such as xylene and/or methylene chloride; while a suitable solid carrier are silicates, and especially talcum (magnesium silicate) and/or tonsil. Alkylarylpolyglycol ethers, alkylarylsulfonates and fatty acid-polyglycolethers may be employed as emulsifiers singly or as mixtures. Suitable wetting agents include sodium N-oleyil-N-methyltaurylsulfonate.

It is also possible to employ the active agents of the invention in mixtures with other pesticides.

The compositions may be prepared according to known methods, for example, by mixing or dissolving the active agent with or in the addition to the agents referred to, with or without the use of mixing machines. The following examples illustrate suitable compositions:

Example 1

| | Percent |
| --- | --- |
| Active agent | 20 |
| Xylene | 75 |
| Mixed emulsifier (alkylarylpolyglycol ether, alkylaryl sulfonate, and fatty acid polyglycol ether) | 5 |

Example 2

| | Percent |
|---|---|
| Active agent | 15 |
| Talcum (magnesium silicate) | 85 |

Example 3

| | Percent |
|---|---|
| Active agent | 15 |
| Hexachlorobenzene | 15 |
| Tonsil | 35 |
| Talcum | 35 |

While the invention has been described with particular reference to specific embodiments, it is to be understood that it is not to be limited thereto but is to be construed broadly and restricted solely by the scope of the appended claim.

We claim:
1. A method of disinfecting seeds which comprises contacting fungus-infected seeds prior to sowing with an amount of a seed disinfectant comprising p-chlorobenzyl isothiocyanate sufficient to destroy the fungus present with said seeds.

References Cited
UNITED STATES PATENTS 3,113,908  12/1963  Pieroh et al. ___ 167—39

FOREIGN PATENTS 579,233  7/1959  Canada.

ALBERT T. MEYERS, *Primary Examiner.*

S. FRIEDMAN, *Assistant Examiner.*